United States Patent [19]

David et al.

[11] Patent Number: 5,252,654
[45] Date of Patent: Oct. 12, 1993

[54] ORGANIC-INORGANIC POLYMERIC COMPOSITES

[75] Inventors: Israel A. David; Mark A. Harmer; Jeffrey S. Meth; George W. Scherer, all of Wilmington, Del.

[73] Assignee: E. I. Du Pont de Nemours and Company, Wilmington, Del.

[21] Appl. No.: 725,168

[22] Filed: Jul. 3, 1991

[51] Int. Cl.$^5$ .............................................. C08K 3/32
[52] U.S. Cl. .................................. 524/414; 524/430; 524/434; 524/437; 524/494
[58] Field of Search ............... 524/430, 434, 437, 494, 524/414

[56] References Cited

U.S. PATENT DOCUMENTS

| | | | |
|---|---|---|---|
| 3,817,911 | 6/1974 | Taylor | 260/38 |
| 4,764,427 | 8/1988 | Hara et al. | 428/400 |
| 4,772,660 | 9/1988 | Kitamura et al. | 524/786 |
| 4,999,243 | 3/1991 | Maeda | 428/372 |
| 5,006,390 | 4/1991 | Kavesh et al. | 428/105 |

FOREIGN PATENT DOCUMENTS 281082 9/1988 European Pat. Off. .

OTHER PUBLICATIONS

H. Schmidt, J. Non-Cryst. Sol., 73:681-691 (1985).
E. J. A. Pope et al., J. Mater. Res. 4:1018-1026 (1989).
H. Schmidt, J. Non-Cryst. Sol. 112:419-423 (1989).
M. W. Ellsworth et al, J. Am. Chem. Soc., 113:2756-2758 (1991).
C. J. Wung et al., Polymer, 32 (4):605-608 (1991).

Primary Examiner—Paul R. Michl
Assistant Examiner—John J. Guarriello

[57] ABSTRACT

A polymeric composite of an organic polymer and an inorganic glassy polymer and a process for making such composites which are useful as protective coatings and as nonlinear optical elements.

29 Claims, No Drawings

ORGANIC-INORGANIC POLYMERIC COMPOSITES

FIELD OF INVENTION

This invention relates to a polymeric composite of glassy inorganic polymer with selected organic polymer, and a process for making such a composite. The composites are useful as protective coatings and as nonlinear optical elements.

BACKGROUND OF THE INVENTION

U.S. Pat. No. 3,817,911 describes the production of "composite" materials that are mixtures of organic and inorganic polymers. The mixtures are made by the simultaneous formation of the organic and inorganic polymers. In all of the Examples in this patent it is reported that the organic polymer may be extracted (dissolved) by organic solvent.

H. Schmidt, J. Non-Cryst. Sol., vol. 73, p. 681–691 (1985) presents a general discussion of mixtures of inorganic and organic polymers, especially mixtures in which the inorganic and organic polymers are bound together through ionic, coordination or covalent bonds. Although some uses such as scratch resistant coatings are referred to, relatively little information is provided regarding methods for preparation of the mixtures and their resulting properties.

European Patent Application Publication No. 281,082 describes general methods of making mixtures of inorganic oxides or other aluminum salts with organic polymers. The methods described, both in the Specification and Examples are general, and no specific properties of the resulting mixtures are given.

U.S. Pat. No. 4,772,660 describes the preparation of mixtures of a polymerizable monomer, such as an acrylic type monomer, with a silica or alumina sol. The polymerizable monomer is polymerized by irradiation to form the inorganic-organic polymer mixture. The properties of the final polymer mixture are not described.

E. J. A. Pope, et al., J. Mater. Res., vol. 4, p. 1018–1026 (1989) describe the preparation of transparent silica gel-poly(methyl methacrylate) composites (mixtures). These are made by impregnating silica gel with methyl methacrylate and polymerizing the methyl methacrylate. The resulting mixture is reported to have a measurable glass transition temperature.

H. Schmidt, J. Non-Cryst. Sol., vol. 112, p. 419–423 (1989) describes mixtures of inorganic oxides with organic polymers, which are reported to be single phase. In the examples disclosed, the presence of functional monomers allows the inorganic and organic polymers to bond covalently to each other.

T. Saegusa and Y. Chujo, Abstracts of the 33rd IUPAC International Symposium on Macromolecules, Montreal Canada, Jul. 8–13, 1990, report a series of "homogeneous transparent solid materials" which are mixtures of silica gel and organic polymers having repeating N,N-dialkyl carboxylic amide groups. The authors report that the organic polymer is either extractable with solvent or is covalently bound to the inorganic polymer (silica).

M. W. Ellsworth and B. M. Novak, J. Am. Chem. Soc., vol. 113, p. 2756–2758 disclose the preparation of mixtures of certain olefinic polymers and silica by the simultaneous polymerization of the olefin and the formation of silica by hydrolysis of a silica precursor. In some cases the organic polymer is reported to be nonextractable by solvents. However, in these cases, the possibility of covalent bonding between the organic polymer and silica exists. This question is not addressed by the authors.

C. J. Wung, et al., Polymer, vol. 32, No. 4, p 605–608 (1991) describe the preparation of a poly(p-phenylene vinylene)-silica composite that exhibits third order nonlinear optical properties. This composite is made by heating a mixture of the silica and a polymer which is a precursor to the poly(p-phenylene vinylene).

SUMMARY OF THE INVENTION

This invention comprises a polymeric composite comprising an interpermeating network of a) from about 15 to about 90 percent by volume of an inorganic glassy polymer component, and b) from about 10 to about 85 percent by volume of an organic polymer component, wherein the organic component is unextractable from the composite, and a glass transition point or a crystalline melting point for the organic component is undetectable in the composite, provided that when the organic component is nylon-6, the maximum amount present is 45 percent by volume of the composite.

This invention further comprises a process for the production of a polymeric composite of an interpermeating network of a) from about 15 to about 90 percent by volume of an inorganic glassy polymer component, and b) from about 10 to about 85 percent by volume of an organic polymer component, wherein the organic component is unextractable from the composite, and a glass transition point or a crystalline melting point for the organic component is undetectable in the composite, provided that when the organic component is nylon-6, the maximum amount present is 45 percent by volume of the composite comprising, a) contacting an organic polymer and an inorganic glassy polymer precursor system together in solution in a common solvent; and b) allowing said inorganic precursor system to form an inorganic glassy polymer while simultaneously removing said solvent at such relative rates necessary to yield a composite having the above-described properties.

DETAILS OF THE INVENTION

The compositions disclosed herein are composites of inorganic glassy polymers and organic polymers. The term "inorganic glassy polymer" (IGP) refers to a glassy inorganic compound which has bonds linking the atoms of the inorganic glassy polymer into a network, and which does not have any carbon atoms in the skeleton of the network, although carbon atoms may be present on side chains or groups which are pendent on the skeleton. The term "glassy" is used to describe a substance that behaves much like a solid but is not crystalline. Typical inorganic glassy polymers include, but are not limited to, oxides of Al, B, Si, Sn, Ti, and Zr. Also useful are various other aluminum compounds, such as aluminum phosphate. Preferred inorganic glassy polymers (in both the composite disclosed herein and the process for producing it) are silica, titania, alumina, zirconia, and aluminum phosphate, and especially preferred are silica and aluminum phosphate. It is contemplated that some of the bonds to the metal or metalloid atom of the inorganic glassy polymer may not be part of the skeleton of the glassy network (e.g., some may have nonbridging groups such as —OH attached to them), so long as these bonds are not covalently bound to the organic polymer of the composite.

An "organic polymer" refers to a polymer that contains carbon atoms in the main chain. An organic polymer used in the invention must be soluble in one or more solvents. Preferred solvents are common organic solvents or water. The organic polymeric component will not be extractable after formation of the claimed composite, even though such polymer was not chemically altered while the composite was formed. Preferred organic polymers (in both the composite and the process for producing it) are poly(2-ethyloxazoline), poly(sodium styrenesulfonate), poly(lithium styrenesulfonate), poly(tetrabutylammonium styrenesulfonate), poly(ethylene oxide), poly(methyl methacrylate), poly(N-methyl-4-vinylpyridinium sulfonate), poly(caprolactam) (nylon-6), and poly(vinylpyridine). Other useful organic polymers include polyolefins, poly(vinyl ethers), poly(vinyl esters), poly(acrylate esters), poly(methacrylate esters), polyacrylamides, polyacrylonitrile, polystyrenes, polyethers, polyketones, polyamides, polyesters, polycarbonates and polyimides. All of these may be branched or linear, but all must be soluble in a solvent.

The polymeric composite of the invention comprises inorganic and organic components wherein the organic component is not covalently bound to the inorganic component. It is the nature and selection of the inorganic and organic polymers of the invention, as set forth above, which precludes the possibility of any covalent bonds forming. The term "interpermeating network" is used herein to mean a polymeric composition wherein an organic polymer and a cross-linked inorganic glassy polymer have been combined to form a composite without significant covalent bonding between the organic and inorganic components. By no significant covalent bonding is meant less than about 0.1 mole/kg of composite covalent bonds.

It has been observed, that compositions selected within the range from about 15 to about 90 percent (by volume) of the inorganic component with from about 10 to about 85 percent (by volume) of the organic component comprise the useful range of the invention described herein. It is preferred if the composite is from about 30 to about 60 percent (by volume) of the inorganic glassy polymer and from about 40 to about 70 percent (by volume) of the organic polymer. An exception to this observation was noted in the case where nylon-6 was selected as the organic polymeric component of the composite. Here, the useful range is from about 10 to about 45 percent (by volume) nylon-6, and from about 55 to about 90 percent (by volume) of the inorganic glassy polymeric component.

The term "inorganic glassy polymer precursor system" (GPPS) describes the compounds needed in solution to form (or affect formation of) the inorganic glassy polymer. The inorganic glassy polymer precursor system will always include at least one compound that contains the metallic or metalloid element present in the inorganic glassy polymer, will usually include a coreactant for that compound, and may include one or more catalysts (or retardants) to speed up, slow down, or otherwise affect the formation of the inorganic glassy polymer. For example, in order to form a silica inorganic glassy polymer, one may use a tetraalkyl silicate as the compound containing the Si, use water as the coreactant, and use a catalyst, such as HCl, which speeds up the reaction to form silica and tends to initially make less highly branched silica, which is desirable. A further example would be the formation of an aluminum phosphate inorganic glassy polymer, wherein an aluminum compound such as aluminum isopropoxide could be used; with phosphoric acid as the coreactant. Such inorganic glassy polymer precursor systems and their chemistries are further described in European Patent Application 281,082, which is hereby incorporated by reference.

Although generally, all components of the inorganic glassy polymer precursor system should be soluble in the solvent in which the process is carried out, the compound containing the metal or metalloid need only be partially soluble at the start of the process, so long as before extensive condensation of the inorganic glassy polymer precursor system has occurred, all of the compound containing the metal or metalloid is in solution. The compound may fully dissolve while condensing because it reacts to form more soluble compound(s), or because the composition of the solution has changed (as by removal of some solvent) so that the compound is now soluble.

The solvent used in the process for making the composites disclosed herein should be capable of dissolving all of the components used in the process, with the optional exception of the compound containing the metal or metalloid atom. As stated above, before extensive gelation of the inorganic glassy polymer has occurred, all of the components should be in solution. Therefore, the solvent chosen must initially be an effective solvent for the organic polymer.

The polymeric composites of the present invention show no detectable glass transition temperature (Tg) or crystalline melting point (Tm) due to the organic polymer. Both of these can be measured by Differential Scanning Calorimetry (DSC) which is well known to those skilled in the art. A change of less than 10% of the expected enthalpy change based on the volume fraction of the organic polymer in the DSC scan at a heating rate of 20° C./min means that no Tg or Tm has been detected.

It is characteristic that the organic polymeric component of the invention are unextractable by solvent, even by solvents in which the organic polymer is normally soluble. By unextractable is meant that no more than 5%, and preferably no more than 1%, of polymer present can be extracted. However, solvents that are able to chemically attack (chemically react with) either the inorganic glassy polymer or organic polymer so as to dissolve either the organic polymer or inorganic glassy polymer are not included within the definition of solvents suitable for the purposes of this invention.

The properties of nonextractability and lack of a DSC event are believed to be due to the uniform distribution of the organic polymer in the inorganic polymer "matrix". This type of polymer composite can be described as homogeneous or single phase. It is believed that no Tg or Tm can be detected and the organic polymer cannot be extracted by solvent because the organic polymer molecules are dispersed in the inorganic glassy polymer network at a molecular or near molecular level. The entanglement of the organic polymer molecules with the inorganic glassy polymer will not allow extraction of the organic polymer or formation of "bundles" of organic polymer large enough to have a Tg or Tm. Although somewhat brittle, the mixtures of the invention are hard, abrasion resistant, solvent resistant, and transparent, making them particularly useful as protective coatings.

Other tests conducted on the composites of the invention also give results in accord with a relatively homogeneous mixture. Small angle X-ray scattering analysis indicates (see Examples) that a single phase is present. For examples measured, inhomogeneities larger than about 20Å were not present. Small angle X-ray scattering was carried out using a Kratky small angle X-ray diffractometer using Ni filtered Cu $K_\alpha$ radiation digitally step scanned, and detected with a scintillation counter that counted 20 sec/data point. Similarly, transmission electron microscopy on the samples tested indicated that no second phases larger than about 20Å were present. The transmission electron microscopy was done on microtomed sections 600–800Å thick that were mounted on a 200 mesh grid with a carbon film, using a JEOL 2000FX transmission electron microscope. Wide angle X-ray scattering was performed on a Philips diffractometer using Ni filtered Cu Ko radiation detected by a scintillation counter in an approximately 30 minute scan. BET absorption tests, using krypton, (a standard test for surface area that detects pores in the range of about 20Å to about 600Å) indicated that the composites tested herein had essentially no such pores. Also, transmission electron micrographs revealed no porosity larger than 20Å.

The general concept of "sol-gel" processes are known by others skilled in the art to produce solidified mixtures of organic and inorganic polymers. However, the process control parameters needed to produce the novel composites herein have not been previously suggested or disclosed. As evidenced by the Examples herein, there are complex interrelationships between the ingredients and conditions used in the novel process of the present invention.

It is first necessary to choose the organic polymer and inorganic glassy polymer desired for the final polymer mixture. Then, the necessary components of the inorganic glassy polymer precursor system from which the inorganic glassy polymer will be derived are determined. Next a solvent should be chosen. The solvent must dissolve the organic polymer, the coreactant, and (eventually) the compound(s) containing the metal or metalloid atom. In addition, the volatility of the solvent is usually an important consideration (see below). Although generally all components of the inorganic glassy polymer precursor system should be soluble in the solvent in which the process is carried out, the compound containing the metal or metalloid need only be partially soluble at the start of the process, so long as at some point before gelation of the inorganic glassy polymer, all of the compound containing the metal or metalloid is in solution. The solvent selected should be capable of easily and completely dissolving the organic polymer. Solvents for many common polymers are known, see for example O. Fuchs in J. Brandrup and E. H. Immergut, Ed., Polymer Handbook, 3rd Ed., John Wiley & Sons, New York, 1989, p. VII379–VII407. The use of so-called theta solvents, which are considered borderline solvents, is undesirable. It is critical to the process that the solvent help maintain the process ingredients in a single phase as long as possible, and at least until the inorganic glassy polymer gels. Therefore solvents that are good solvents for the organic polymer and the inorganic glassy polymer just before gelation are particularly preferred. It has been found that solvents that have solubility parameters within the range of the solubility parameters of the other ingredients are particularly likely to provide a successful outcome.

It is theorized that in order to carry out the instant process successfully, the mobility of each organic polymer molecule must be restricted as gelation of the inorganic glassy polymer starts. The organic polymer molecules become randomly "trapped" in the three dimensional mesh of the inorganic glassy polymer matrix. This trapping prevents the organic polymer molecules from diffusing together into larger domains (phases) as the inorganic glassy polymer gel is formed. In practice, this means that the amount of solvent remaining in the process liquid must be limited as gelation of the inorganic glassy polymer proceeds. Thus, a balance must be struck between the rate of gelation of the inorganic glassy polymer and rate of removal of solvent. Solvent is most typically removed by evaporation as the reaction(s) to form the inorganic glassy polymer proceed. This balance is complicated by the fact that usually the rate of gelation of the inorganic glassy polymer is dependent on the concentration of inorganic glassy polymer precursor system (and the intermediates formed from the inorganic glassy polymer precursor system while reacting to form the inorganic glassy polymer), and is usually increasing as the solvent is removed. If the solvent is removed too fast in relationship to the gelation of the inorganic glassy polymer two phases will be observed before substantial gelation of the inorganic glassy polymer takes place. Alternatively, if gelation occurs before enough solvent has been removed, two phases are observed after gelation of the inorganic glassy polymer has occurred. Gelation of the inorganic glassy polymer usually leads to a relatively sharp increase in viscosity of the process fluid, and is easily observed.

If two phases are observed before gelation of the inorganic glassy polymer takes place, it means that either the inorganic glassy polymer precursor system, which is reacting to form the inorganic glassy polymer or the organic polymer, has become at least partially insoluble in the process liquid. The process liquid at this time consists of the remaining solvent, the organic polymer, and the intermediates and byproducts from the inorganic glassy polymer precursor system. If the solvent evaporation rate is too high, the two phases are forming because there is not enough solvent left to keep all of the ingredients in a single phase. In this case a solvent that evaporates slower (is less volatile) can be used; the process can be run under conditions under which the solvent evaporates more slowly, or the formation of the inorganic glassy polymer can be speeded up. Slower evaporation may be achieved by slowing the flow over the solution surface of gas that is removing the solvent vapor, or by cooling the process liquid. However, the latter also causes the reactions forming the inorganic glassy polymer to slow. The inorganic glassy polymer formation rate may be increased by adding more or a stronger catalyst for the formation of the inorganic glassy polymer; by allowing the solution to "pre-age" before starting to evaporate solvent; by raising the coreactant concentration; and/or by using faster-reacting metal or metalloid compounds. It is also possible to select solvents that more readily dissolve (are better solvents for) the components of the process mixture. In this regard, mixed solvents may be particularly valuable, but consideration must be given to variable evaporation rates which may cause the solvent to change composition.

If two phases are observed after gelation of the inorganic glassy polymer, the mesh size of the gel is too large to trap the organic polymer molecules. Mesh size is dictated by the concentration and form of the gel (more precisely, the precursor to the gel) in solution, since the gel occupies the entire liquid volume. Thus, the volume of the solution must be further reduced, or inorganic glassy polymer precursor system concentration increased, before gelation of the inorganic glassy polymer takes place. Alternatively, the molecular weight of the polymer may be increased, or the polymer made more highly branched. Also, the rate of reaction(s) leading to gelation may be reduced compared to the reduction of solution volume.

The rate of the reactions leading to gelation may be reduced by lowering the concentration of coreactant, lowering the concentration of or using a less powerful catalyst for the gelation reaction, and/or by using a less reactive metal or metalloid compound. The rate of evaporation of the solvent may be increased by using a more volatile solvent or by increasing the flow across the liquid surface of gas that is removing the solvent vapor. Heating the process liquid will increase the rate of solvent removal, but will also probably increase the rate of the gelation reaction.

Methods of choosing and changing solvents, and carrying out the various instructions given above are known to those skilled in the art. Changing the rates of reaction of various types of inorganic glassy polymer precursor systems are known to those skilled in the art, see for example European Patent Application 281,082, H. Schmidt, J. Non-Cryst. Sol., vol. 112, p. 419–423 (1989), and C. J. Brinker and G. W. Scherer, Sol-Gel Science, Academic Press, Boston, 1990, each herein incorporated by reference.

In order to minimize the time needed to carry out the process, it is preferred that a relatively concentrated solution of the organic polymer and inorganic glassy polymer precursor system should be used initially, and also that the solution be allowed to "pre-age" before allowing solvent to evaporate. "Pre-aging" means allowing the inorganic glassy polymer precursor system sufficient time to allow the inorganic glassy polymer precursor system to react. For example, in a system in which silica or alumina are the inorganic glass, the most common precursors are compounds that hydrolyze (formally) to $Si(OH)_4$ or $Al(OH)_3$. In this case, the pre-aging time for the aluminum system may only be a few seconds, since these reactions are often very fast, while the pre-aging time for the silicon system may be several hours, since these reactions are often slower. Those skilled in the art will be familiar with the reaction rates of these types of systems. Starting with these or other conditions, the factors discussed above can be used to achieve a successful result.

In the composites and process disclosed herein, more than one organic polymer and/or more than one inorganic glassy polymer may be present. However, the greater number of polymeric, or potentially polymeric ingredients chosen, the more complicated it will be to maintain a one phase system during the critical periods of the process, (e.g., to have gel formation so that the organic polymer is trapped in the inorganic glassy polymer mesh).

The composites of the present invention are useful as protective coatings and also may be used as elements that exhibit 3rd order nonlinear optical (NLO) activity. The process of the present invention is useful in the preparation of such composites. The composites can be used in a wide variety of nonlinear optical applications, e.g., optical signal processing or signal switching. The NLO composition is obtained by selecting as a starting material an organic polymer that is soluble and exhibits 3rd order NLO activity. Such polymers typically have extensively delocalized $\pi$ bond networks. Suitable polymers include poly[5,7-dodecadiyn-1,12-diol bis(n-butoxycarbonylmethyl urethane)] [herein abbreviated 4-BCMU, synthesis described in G. N. Patel, Polymer Preprints, American Chemical Society. Division of Polymer Chemistry, vol. 19, No. 2, p. 154–159 (1978)], and poly{5,7-dodecadiyn- 1,12-diol bis[(N-carboxymethyl)urethane] dipotassium salt} [herein abbreviated 4-KAU; synthesis described in A. F. Preziosi, et al., Polymer Preprints, American Chemical Society, Division of Polymer Chemistry, vol. 21, No. 2, p. 166–167 (1980)]. The 3rd order NLO properties in the composites herein can be measured by methods described in H. Vanherzeele, et al., Appl. Phys. Lett., vol. 57, p. 663–665 (1991), and H. Vanherzeele, Appl. Optics, vol. 29, p. 2246–2258 (1990). For mixtures which exhibit 3rd order NLO properties, it is preferred if the inorganic glassy polymer is silica or alumina.

The following examples illustrate the present invention but are not intended to limit it in any manner. The following abbreviations are used in the examples:

TEOS—tetraethyl orthosilicate
PEOX—poly(ethyloxazoline)
THF—tetrahydrofuran
TEM—transmission electron micrograph
DSC—differential scanning calorimetry
NaPSS—sodium poly(styrene sulfonate)
LiPSS—lithium poly(styrene sulfonate)
Bu$_4$NPSS—tetrabutylammonium poly(styrene sulfonate)
PMMA—poly(methylmethacrylate)

EXAMPLE 1

A solution containing 114.1 g tetraethyl orthosilicate (TEOS), 96.3 g ethanol, 10.0 g distilled water, and 0.4 g 1 M HCl was heated under reflux for 1.5 hr, then cooled to room temperature. To 200 ml of this solution was added 8.0 g of distilled water and 24.0 g of 1 M HCl, and the solution was stirred at room temperature for 15 min. To 86.6 ml of the resulting stock solution was added, by pipetting, 30 ml of a solution of 5 g of 500,000 molecular weight poly(ethyloxazoline) (PEOX) in 25 ml of tetrahydrofuran (THF). The resulting very pale yellow clear solution was stirred at room temperature for 15 min. Aliquots (20 ml) were transferred to polystyrene containers, and kept at 50° C. Gelation occurred after standing overnight. After slow evaporation of the solvent at this temperature, a brittle transparent solid was obtained. (The bottom portion was opaque due to extraction of components of the container by the solvent.) The clear composite was completely insoluble in tetrahydrofuran and water, both of which ordinarily dissolve the polymer. It had essentially the same silica/polymer ratio (2.00) as in the starting materials used (1.92). Transmission electron micrographs (TEM) showed this composite to consist of only one phase. In differential scanning calorimetry (DSC), the glass transition (Tg) at ~65° C. characteristic of the polymer did not occur in the composite, indicating that the polymer did not exist as a separate phase. Infrared spectra of the composite and its components were consistent with these other results in that the carbonyl band was shifted from 1642 wavenumbers in the polymer to 1629 in the composite and the Si-0 band from 1079 in silica to 1073, indicating molecular interactions. The spectrum was otherwise unchanged indicating that these shifts were due to physical interactions. On pyrolysis, a sample of the solid retained its shape and became opaque due to crazing.

EXAMPLE 2

TEOS (7.4 ml, 6.9 g) was added to a solution of 1 g of PEOX in 33 ml of ethanol. A solution of 0.14 ml of concentrated HCl in 3 ml of water was then added. A portion of this solution was drawn down on a glass panel with a 50-mil doctor blade. The resulting coating was clear, colorless, and brittle after drying. There was no evidence of the PEOX $T_g$ in the DSC.

EXAMPLE 3

Ethanol and TEOS were added to a solution of PEOX in tetrahydrofuran containing 0.08 g polymer per 1 ml of solution. The solution was heated to boil. Acidified water was added dropwise with good stirring. Part of the resulting solution was poured into a Teflon ® container, and let stand. The rest was drawn down on a flat panel. After the solvent had fully evaporated and the silica fully condensed, the structures were rated for brittleness on a subjective scale of 1 = brittleness of $SiO_2$ to 5 = flexibility of the particular polymer. They were also tested in boiling water for 2 hr. PEOX dissolves in water at room temperature. DSC scans were also obtained. Conditions and results are described in Table I.

TABLE I

| $SiO_2$ (vol %) | Amount (ml) | | | | | Poly $T_g$ | Brittleness | Effect of Boiling Water |
|---|---|---|---|---|---|---|---|---|
| | PEOX Sol'n. | TEOS | EtOH | $H_2O$ | 1 M HCl | | | |
| 8.5 | 2.6 | 0.15 | 1.5 | 0.25 | 0.4 | small | 5 | fractured |
| 13.2 | 15.6 | 1.5 | 4.0 | 1.0 | 1.6 | no | 3.5 | fractured |
| 18.3 | 2.6 | 0.37 | 1.5 | 0.25 | 0.4 | no | 3 | fractured |
| 24.8 | 2.6 | 0.54 | 1.5 | 0.25 | 0.4 | no | 2.5 | fractured |
| 40.5 | 1.7 | 0.75 | 0.75 | 0.13 | 0.2 | no | 2 | insoluble |
| 48.0 | 10.4 | 6.1 | 6.1 | 1.0 | 1.6 | no | 2 | insoluble |

EXAMPLE 4

To 21.6 ml of the stock solution of Example 1 was added 26.2 ml of a solution of 5 g of 5 million molecular weight poly(ethylene oxide) in 100 ml of water. The resulting viscous solution was stirred at room temperature for 15 min. Aliquots (20 ml) were treated as described in Example 1. The resulting product was a white opaque foamy brittle solid. Scanning electron micrographs showed an intertwining fibrous, vermicular network with no evidence of a second phase within the fibrous structure. Transmission electron micrographs showed some form of microstructure, probably associated with the fibrous network. In differential scanning calorimetry, the poly(ethylene oxide) melting point of 70° C. was not present. After pyrolysis, the scanning electron micrographs showed no difference from the original, except for some smoothing of the edges due to sintering, which is characteristic of silica. Silica content was 57.3% by weight (37% by volume).

COMPARATIVE EXAMPLE 1

To 28.9 ml of the stock solution of Example 1 was added by pipetting 10 ml of a solution of 5 g. of poly(-vinylpyridine) of molecular weight 60,000 in 25 ml of methanol. A portion of the polymer precipitated. After further treatment as in Example 1, a yellow compact solid was obtained. It contained 48.8% silica as determined by silicon analysis. Transmission electron micrographs showed distinct separate phases. In differential scanning calorimetry, the 145° C. glass transition temperature of the polymer was present, indicating a separate polymer phase.

EXAMPLE 5

A stock solution of tetraethyl orthosilicate was made up as in Example 1, except that diglyme was substituted for the ethanol. To 86.6 ml of this solution was added 30 ml of a solution of poly(ethyloxazoline) in 50 ml of diglyme. The resulting solution was stirred at room temperature for 15 min. Aliquots (20 ml) were then placed in Teflon ® containers. After standing at room temperature for 27 days, the sample had gelled and formed a colorless, transparent solid which was somewhat less brittle than that of Example 1. In differential scanning calorimetry, the ~65° C. glass transition temperature of the polymer was not present.

COMPARATIVE EXAMPLE 2

One of the 20 ml aliquots of Example 5 was left to stand at 50° C. instead of ambient temperature. The product was an opaque, white solid.

EXAMPLE 6

A solution containing 57.1 g tetraethyl orthosilicate, 48.1 g ethanol, 5.0 g distilled water, and 0.2 g 1 M HCl was heated under reflux for 1.5 hr, then cooled to room temperature. To 50 ml of this solution was added 2.0 ml of distilled water and 6 ml of 1 M aqueous acetic acid, and the solution was stirred at room temperature for 15 min. To 21.6 ml of this stock solution was added 7.5 ml of a solution of 5 g poly(ethyloxazoline) in 25 ml of tetrahydrofuran. The resulting solution was stirred at room temperature for 15 min. An aliquot of ~23 ml was placed into a Teflon ® container, and let stand at room temperature. After evaporation of the solvent, a colorless transparent solid was obtained.

EXAMPLE 7

To 43.3 ml of the stock solution of Example 6 was added 15 ml of a solution of 20 g of 50,000 molecular weight poly(ethyloxazoline) in 100 ml of tetrahydrofuran. The resulting solution was stirred for 15 min at ambient temperature. A ~20 ml aliquot was placed into a Teflon ® container, and let stand at room temperature. After 29 days, there was obtained a colorless, transparent solid.

EXAMPLE 8

Example 3 was repeated, except that a solution of NaPSS (PSS is used herein to designate polystyrene sulfonate) in water was used in place of the solution of PEOX in THF, and not all the starting solutions were heated. Results obtained are shown in Table II.

TABLE II

| SiO₂ (vol %) | NaPSS (g) | Amount (ml) | | | | Effect of |
| | | TSEO | EtOH | H₂O | 1 M HCl | Boiling Water |
|---|---|---|---|---|---|---|
| 0 | a | 0 | 0 | 0 | 0 | soluble |
| 48 | 0.8 | 6.1 | 7.1 | 10.5 | 0.13[b] | insoluble |
| 100 | 0 | 1.5 | 1.5 | 0.25 | 0.4 | insoluble |

[a] Not measured amount
[b] Used conc. HCl

EXAMPLE 9

Poly(styrene sulfonic acid) was prepared by passing an aqueous solution of 5 g of NaPSS through 50 g of Rexyn® 101 H. LiPSS was prepared by neutralizing this solution with LiOH, and evaporating to dryness in a rotary evaporator. The residue, 3.8 g, was dissolved in a combination of 30 ml of methanol and 20 ml of water. The hazy solution was filtered to remove the insignificant amount of insoluble impurity. To the clear filtrate was added 5 ml of methanol and 30 ml of ethanol. TEOS (28.4 ml) was added to the resulting solution, and brought into solution by adding an additional 30 ml of ethanol and 15 ml of water. The solution was then acidified with 0.62 ml of conc. HCl, which caused complete clarification. A small portion dropped on a flat panel gave a clear film after drying.

EXAMPLE 10

Bu₄NPSS was prepared in the same fashion as was LiPSS in Example 9. A coating solution was made in the same fashion as in Example 9 except that Bu₄NOH was used in place of LiOH, using these amounts of ingredients: 4.0 g Bu₄NPSS, 30 ml methanol, 35 ml ethanol, 30 ml TEOS, 4.84 ml water, and 0.65 ml conc. HCl. A small portion dropped on a flat panel gave a clear film after drying.

EXAMPLE 11

A solution containing 0.55 ml of a PMMA (polymethyl methacrylate) solution in THF of conc. 0.18 g/ml, 1.51 ml of tetrakis(methoxy-ethoxyethoxy)silane, 0.76 ml additional THF, and 0.14 ml 1.5 M HCl was dropped onto a glass panel heated at 94° C., and left until dry. The clear, somewhat brittle film was digested in boiling water and dried under vacuum. DSC did not show the polymer $T_g$.

EXAMPLE 12

A solution containing 0.55 ml of a PMMA solution in THF of conc. 0.18 g/ml, 0.76 ml of TEOS, 0.76 ml additional THF, and 0.14 ml 1.5 M HCl was dropped onto a glass panel heated at 110° C., and left until dry. DSC of the clear, somewhat brittle film did not show the polymer $T_g$.

EXAMPLE 13

A solution containing 0.037 g of 6-nylon, 0.76 ml of formic acid, 0.76 ml of TEOS, 0.76 ml of ethanol, and 0.09 ml of water was drawn down on a glass panel. After drying, the coating was clear and brittle and had no melting point or Tg in DSC. The control coating made in similar fashion, but without TEOS, was cloudy to milky and had a $T_g$ of 52° C. and melting point of 219° C. in DSC.

EXAMPLE 14

A solution containing 0.1 g of poly(N-methylvinyl-pyridinium sytrene sulfonate) (MeVPyrSS), 2.45 ml of 96% formic acid (which contained 0.12 ml of water), 0.76 ml of TEOS, and 0.76 ml of ethanol was drawn down on a glass panel. After drying, the coating was very slightly hazy and brittle and had no $T_g$ in DSC. The control coating made in similar fashion, but without TEOS, ethanol, or water, was cloudy to milky and had a $T_g$ of 249° C. in DSC

EXAMPLE 15

A solution containing 1.06 ml of a stock solution of PEOX in methanol of conc. 0.09 g/ml, 1.49 ml of tetraisopropyl titanate, 0.26 ml of acetylacetone, and 0.21 ml of 1.5 M HCl was drawn down on a glass panel. After drying, the coating was very clear and very brittle. DSC did not show the polymer $T_g$.

EXAMPLE 16

To 8 ml of a stock solution of PEOX in acetone, containing 0.75 g of the PEOX, was added 5.56 ml of TEOS, an additional 5 ml of acetone to redissolve the precipitated polymer, then a solution of 0.105 ml of 12 M aqueous HCl in 2.25 ml of water. The resulting milky solution clarified in ~45 sec. Two drawdowns were made from this solution on glass plates; one immediately and the other after ~16 hr. After drying, the drawdown that had been made immediately contained milky streaks, indicating some phase separation. The other drawdown was fully clear.

EXAMPLE 17

TEOS (371 ml) was added to a solution of 50 g of PEOX in 170 ml of ethanol. The solution became cloudy. A solution of 7 ml of 12 M HCl in 150 ml of water was added to this solution, which then became clear. This solution was concentrated by heating under reduced pressure until a total of ~315 ml of solvent was removed. Part of this solution was drawn down on a glass plate. Another portion was stored in a closed bottle. After drying, the drawdown was clear, glassy and brittle. After standing ~3 days, the solution in the bottle had gelled and had become milky, indicating phase separation.

COMPARATIVE EXAMPLE 3

TEOS (3.7 ml) was added to 12.5 ml of a solution of PEOX in diethylene glycol dimethyl ether containing 0.50 g of PEOX. A precipitate formed. A solution of 0.07 ml of 12 M HCl in 1.5 ml of water was added. The mixture became clear after ~14 min. After standing ~3 hr, this solution was used to make a drawdown. After a few min., the clear drawdown separated into two phases. It dried to a non-uniform, cloudy to milky coating, indicating two phases.

EXAMPLE 18

TEOS (0.56 ml), then a solution of 0.01 ml of 12 M HCl in 0.23 ml of methanol, were added to a solution of 0.85 g of PEOX in 11 ml of ethanol. The solution remained clear throughout. It was poured into an uncovered Teflon® container. After evaporation of the solvent, the residue was a clear, flexible disc. When the experiment was run with THF instead of ethanol, a precipitate formed on addition of the acidified water. It could not be dissolved by addition of more THF.

COMPARATIVE EXAMPLE 4

Example 15 was repeated with larger and smaller amounts of acetylacetone chelating agent. With smaller amounts or no acetylacetone, gelation was so fast that drawdowns could not be made, and the gel or precipitate formed was not clear, indicating that it was not of single phase. With larger amounts of acetylacetone, the drawdowns were not clear and were soluble in acetone, indicating that they were not of one phase and that the inorganic precursor had not yet gelled.

EXAMPLE 19

Ethanol (6.1 ml) and TEOS (6.1 ml) were added to 10.4 ml of a solution containing 0.8 g of PEOX in THF, and the resulting solution was heated to boiling. A solution of 1.6 ml of 1 M aqueous HCl in 1 ml of water was added, and the resulting solution was cooled to room temperature. A portion was drawn down on a glass plate and another portion poured into an uncovered Teflon ® container. After the solvent had evaporated, the brittle, glassy, residue in the container was hazy, indicating two phases, but the drawdown was clear.

COMPARATIVE EXAMPLE 5

The procedure of Example 12 was repeated, except that the solution was not heated. The resulting brittle, glassy residue was milky.

EXAMPLE 20

To a solution containing a PEOX in THF solution (1 g in 13 ml solution), TEOS, ethanol, and water in the volume ratio 5.2, 3.05, 3.05, 0.5, was added either 1 M aqueous HCl or triethylamine to adjust the pH to various values. Each resulting solution was drawn down on a glass plate. After drying, the drawdowns of pH <2 were brittle and clear. Those of pH >2 were soft and irregularly white, and had a $T_g$ in the DSC.

EXAMPLE 21

A solution containing 0.06 g of 4KAU, 75 ml of TEOS, 2 ml of N-methylpyrrolidinone, 4.9 ml of water, and 2 µl of 12 M HCl was placed on a silica wafer. After standing for ~1 min, the solution was spin coated at ~500 rpm. The resulting clear coating had a 3rd order non-linearity of $5.6 \times 10^{-12}$ esu.

EXAMPLE 22

A portion of a solution containing 0.65 ml of a solution of PEOX in THF containing 1.0 g. of PEOX, 3.3 g of zirconium tetraisopropoxide, 0.87 ml of acetylacetone, 8 ml of THF, 0.31 ml of water, and 0.07 ml of 12 M HCl was poured into a Teflon ® container. After evaporation of the solvent, the residue was a clear, brittle, glassy solid.

EXAMPLE 23

A solution containing 4.0 g of NaPSS, 30.5 ml of TEOS, 52 ml of water, 48.5 ml of ethanol, and 0.65 ml of 12 M HCl was spin-coated onto a polycarbonate disc. After the solvent evaporated, the coating had excellent antistatic properties and good scratch resistance.

EXAMPLE 24

A solution consisting of 3.6 ml of an ethanolic solution of PEOX containing 1.0 g of PEOX, 7.4 ml of TEOS, 8.0 ml of the 1:2 mole complex of tetraisopropyl titanate and acetylacetone, 1.2 cc. of ethanol, 3.0 ml of water, and 0.14 ml of 12 M HCl was drawn down on a glass plate. After evaporation of the solvent, the residue was clear, yellow, and brittle.

EXAMPLE 25

Example 2 was run with other ratios of TEOS to PEOX, and appropriate adjustment in the other ingredients, to give composites containing 4.8, 7.4, 10.2, 13.2, 31, 48.0 and 64 volume % silica, and the solutions left to evaporate in Teflon ® jars Measurement of surface area by the BET method, using krypton as the gas, showed surface areas of <0.08 m$^2$/g. for all the compositions except the 64% sample, which had a surface area of <0.2 m$^2$/g. These low numbers show that the composite is not porous. Wide angle X-ray diffraction scans on the samples of all contained different peaks from those of PEOX controls, whereas a sample of silica/PEOX composite known to be of 2 separate phases showed peaks corresponding to those of the PEOX control. Solid state $^{29}$Si NMR spectra of the samples of containing 48 and 13.2 volume % silica, and of a control sample of 100 volume % silica, showed an upward progression in the ratio of $Q^4$ to $Q^3$ species (see Brinker and Scherer, supra). This supports a structure having a very intimate intertwining of the organic polymer and inorganic network molecules. The organic polymer interferes with the formation of inorganic crosslinks.

EXAMPLE 26

This reaction was done in a box which was kept under a nitrogen atmosphere. PEOX (0.78 g) was dissolved in 50 ml of dry isopropanol over a period of about one hour. To this was added 5.0 g of aluminum di(sec-butoxide)ethylacetoacetate, $Al(OC_4H_9)_2(C_6H_9O_3)$. While stirring 1.0 ml of 36.5% HCl was added and the solution was stirred for 30 min. To the stirred solution was added 1.62 g of $H_3PO_4$ in 5 ml of isopropanol. This solution was then poured into an open beaker and the solvent slowly evaporated, leaving a clear, colorless, completely transparent glass-like material. This material showed no glass transition in the range expected for PEOX.

A sample was also heated to 150° C. under nitrogen for 10 hr and the sample was analyzed by DSC. Again, no glass transition temperature was observed.

EXAMPLE 27

To 0.5 g of poly(vinylpyridine) (PVP) in 50 ml of methanol was added 1.4 g of $AlCl_3$. After the aluminum chloride has dissolved (30 min) then 1.21 g of 85% phosphoric acid was added very slowly. The solution was then stirred and nitrogen was bubbled through the solution to reduce the volume. Films were cast and left to dry. The dry film was then heated at 150° C. for 10 hr under nitrogen. There was no transition in the DSC.

EXAMPLE 28

One g of PEOX was dissolved in 100 ml of methanol. To this was added 2.81 g of $AlCl_3$ and stirred. To this was then added 2.44 g of 85% phosphoric acid and the solution stirred for an hour. The volume was reduced and a film spread. The dried film was then heated under nitrogen for 10 hr at 175° C. The resultant film did not show a phase transition of the polymer in the DSC.

EXAMPLE 29

Ten grams of PEOX was dissolved in 100 ml of methanol. To this was added 13.3 g of $AlCl_3$ while the solution was stirred under nitrogen. To this was added one equivalent of phosphoric acid per aluminum atom, adding the phosphoric acid as 85% phosphoric acid in 20 ml of methanol. The addition took place over a period of about one hour and the flask was kept cool with ice although this is not critical. After the addition was complete, a clear solution was obtained and the volume was reduced by bubbling nitrogen into the solution to remove the solvent. Films were then cast on glass slides and left to dry. The dry glass-like film was then heated under nitrogen overnight at 175° C. The transparent films did not show any glass transition for PEOX.

EXAMPLE 30

Five grams of PEOX was dissolved in 100 ml of methanol. To this 1.66 g of $AlCl_3$ was added slowly. Then 1.44 g of 85% phosphoric acid was added dropwise. A clear solution was obtained. The volume was reduced by bubbling nitrogen into the solution and a film was spread on glass. The film dried and looked very clear and crack free. This was heated at 1° C. per minute to 175° C. and held at that temperature for 10 hr under nitrogen. DSC showed no glass transition.

EXAMPLE 31

Five grams of PEOX was dissolved in 100 ml of methanol To this was slowly added 0.88 g of $AlCl_3$. Then 0.77 g of 85% phosphoric acid was added dropwise. A clear solution was obtained, the volume was reduced by bubbling nitrogen in to the solution and a film was spread on glass. The film dried and was very clear and crack free. This was heated at 1° C. p®r minute to 175° C. and held at that temperature for 10 hours under nitrogen. There was no glass transition detectable by DSC.

EXAMPLE 32

In this example the source of aluminum phosphate is an inorganic precursor molecule known as ACPE. This precursor has been prepared and is known to transform to aluminum phosphate at temperatures as low as 150° C. The complex is a cubic cluster. References which fully describe the preparation of this complex and its properties are as follows: Brit. Ceram. Trans & Journal, J. D. Birchall, Vol. 83, No. 6, 158-165 (1984), "Shells, Cements and Ceramics"; Thin Solid Films, R. N. Rothon, 77, 149-153 (1981), Solution-deposited Metal Phosphate Coatings; and UK Patent 1,322,724.

The precursor complex [{Al(PO4)(HCl)(C2H5OH)3}4], ACPE, was prepared as follows using the route as defined by Example 2 in UK Patent 1,322,724, with a slight modification. Forty grams of aluminum chloride was added to 300 ml of ethyl alcohol. The resultant solution was cooled to 0° C. and 18.6 ml of 88% orthophosphoric acid was added in a dropwise manner and the reaction mixture was stirred. The white cyrstalline solid was separated from the mixture by filtration. This is crystalline ACPE.

ACPE was dissolved in methanol to give a 25% by weight solution. To 50 ml of this was added 50 ml of methanol into which 1.72 g of PEOX had been dissolved. The solutions were mixed and the volume reduced by bubbling nitrogen through the solution and a film was cast. The dried film was heated to 175° C. for 10 hr under nitrogen. The films showed no glass transition of the PEOX in the DSC.

EXAMPLE 33

4-BCMU (59 mg) was dissolved in 2 ml of N,N-diemthylformamide (DMF). To this was added a solution of 1.0 g of $Al(OC_4H_9)_2(C_6H_9O_3)$ aluminum di(secbutoxide)ethylacetoacetate chelate which had been added to 1 ml of DMF and 1 ml of isopropyl alcohol. A clear red solution was obtained. To this was added 0.12 g of water in 2 ml of isopropanol, dropwise. The solution was left to stir for 2 hr and the volume was then reduced by passing a stream of nitrogen gas above the solution. The volume was reduced to about one-third. The material was then placed on the top of glass discs about 2 cm in diameter. These discs were then placed under a nitrogen atmosphere with nitrogen flow over the top. After about two days a hard glass-like even film had formed. This was further dried under vacuum at room temperature for 24 hr. The final disc was completely transparent with a red color.

The loss at 633 nm was measured. The material shows some loss, about 5 dB. This wavelength is in the tail of the absorption so some loss is to be expected. At 1064 nm, the material shows very little loss.

Although preferred embodiments of the invention have been described above, there is no intention to limit the invention to the precise constructions herein disclosed. The right is reserved to all changes coming within the scope of the invention as defined by the appended claims.

What is claimed is:

1. A polymeric composite comprising an interpermeating network of a) from about 15 to about 90% by volume of an inorganic glassy polymer component, and b) from about 10 to about 85 percent by volume of an organic polymer component,
   wherein the organic component is unextractable from the composite, and a glass transition point or a cystalline melting point for the organic component is undetectable in the composite,
   provided that when the organic component is nylon-6, the maximum amount present is 45 percent by volume of the composite.

2. The composite as recited in claim 1 wherein said mixture is about from 30 to about 60 percent by volume of said inorganic glassy polymer and from about 40 to about 70 percent by volume of said organic polymer.

3. The composite as recited in claim 1 wherein said inorganic glassy polymer is silica, titania, alumina, zirconia, or aluminum phosphate.

4. The composite as recited in claim 3 wherein said inorganic glassy polymer is silica.

5. The composite as recited in claim 3 wherein said inorganic glassy polymer is aluminum phosphate.

6. The composite as recited in claim 1 wherein said organic polymer is a polyolefin, poly(vinyl ether), poly(vinyl ester), poly(acrylate ester), poly(methacrylate ester), polyacrylamide, polyacrylonitrile, polystyrene, polyether, polyketone, polyamide, polyester, polycarbonate or polyimide.

7. The composite as recited in claim 1 wherein said organic polymer is poly(2-ethyloxazoline), poly(sodium styrenesulfonate), poly(lithium styrenesulfonate), poly(tetrabutylammonium styrenesulfonate), poly(ethylene oxide), poly(methyl methacrylate), poly(N-methyl-4-vinylpyridinium sulfonate), poly(caprolactam), or poly(vinylpyridine).

8. The composite as recited in claim 4 wherein said organic polymer is poly(2-ethyloxazoline), poly(sodium styrenesulfonate), poly(lithium styrenesulfonate), poly(tetrabutylammonium styrenesulfonate), poly(ethylene oxide), poly(methyl methacrylate), poly(N-methyl-4-vinylpyridinium sulfonate), or poly(caprolactam).

9. The composite as recited in claim 5 wherein said organic polymer is poly(2-ethyloxazoline) or poly(vinylpyridine).

10. The composite as recited in claim 1 which displays 3rd order nonlinear optical activity.

11. The composite as recited in claim 10 wherein said organic polymer is poly[5,7-dodecadiyn-1,12-diol bis(n-butoxycarbonylmethylurethane)], or poly{5,7-dodecadiyn-1,12-diol bis[(N-carboxymethyl)urethane]-dipotassium salt}.

12. The composite as recited in claim 10 wherein said inorganic glassy polymer is silica or alumina.

13. The composite as recited in claim 11 wherein said inorganic glassy polymer is silica or alumina.

14. The composite as recited in claim 1 in the form of a coating.

15. A process for the production of a polymeric composite of an interpermeating network of a) from about 15 to about 90 percent by volume of an inorganic glassy polymer component, and b) from about 10 to about 85 percent by volume of an organic polymer component,
wherein the organic component is unextractable from the composite, and a glass transition point or a cystalline melting point for the organic component is undetectable in the composite,
provided that when the organic component is nylon-6, the maximum amount present is 45% by volume of the composite comprising,
a) contacting an organic polymer and an inorganic glassy polymer precursor system together in solution in a common solvent; and
b) allowing said inorganic precursor system to form an inorganic glassy polymer while simultaneously removing said solvent at such relative rates necessary to yield a composite having the above-described properties.

16. The process as recited in claim 15 wherein said mixture is from about 30 to about 60 percent by volume of said inorganic glassy polymer and from about 40 to about 70 percent by volume of said inorganic glassy polymer.

17. The process as recited in claim 15 wherein said inorganic glassy polymer is silica, titania, alumina, zirconia, or aluminum phosphate.

18. The process as recited in claim 17 wherein said inorganic glassy polymer is silica.

19. The process as recited in claim 17 wherein said inorganic glassy polymer is aluminum phosphate.

20. The process as recited in claim 15 wherein said organic polymer is a polyolefin, poly(vinyl ether), poly(vinyl ester), poly(acrylate ester), poly(methacrylate ester), polyacrylamide, polyacrylonitrile, polystyrene, polyether, polyketone, polyamide, polyester, polycarbonate or polyimide.

21. The process as recited in claim 15 wherein said organic polymer is poly(2-ethyloxazoline), poly(sodium styrenesulfonate), poly(lithium styrenesulfonate), poly(tetrabutylammonium styrenesulfonate), poly(ethylene oxide), poly(methyl methacrylate), poly(N-methyl-4-vinylpyridinium sulfonate), poly(caprolactam), or poly(vinylpyridine).

22. The process as recited in claim 18 wherein said organic polymer is poly(2-ethyloxazoline), poly(sodium styrenesulfonate), poly(lithium styrenesulfonate), poly(tetrabutylammonium styrenesulfonate), poly(ethylene oxide), poly(methyl methacrylate), poly(N-methyl-4-vinylpyridinium sulfonate), or poly(caprolactam).

23. The process as recited in claim 21 wherein said organic polymer is poly(2-ethyloxazoline) or poly(vinylpyridine).

24. The process as recited in claim 15 wherein said organic polymer displays 3rd order nonlinear optical activity.

25. The process as recited in claim 24 wherein said organic polymer is poly[5,7-dodecadiyn-1,12-diol bis(n-butoxycarbonylmethylurethane)], or poly{5,7-dodecadiyn-1,12-diol bis[(N-carboxymethyl)urethane]-dipotassium salt}.

26. The process as recited in claim 24 wherein said inorganic glassy polymer is silica or alumina.

27. The process as recited in claim 25 wherein said inorganic glassy polymer is silica or alumina.

28. The product of the process of claim 15 which displays 3rd order nonlinear optical activity.

29. The product of the process of claim 15 in the form of a coating.

* * * * *